(No Model.)
R. S. JUDSON & G. D. HOLMES.
AIR BRAKE FOR STREET RAILWAY CARS.
No. 530,422. Patented Dec. 4, 1894.
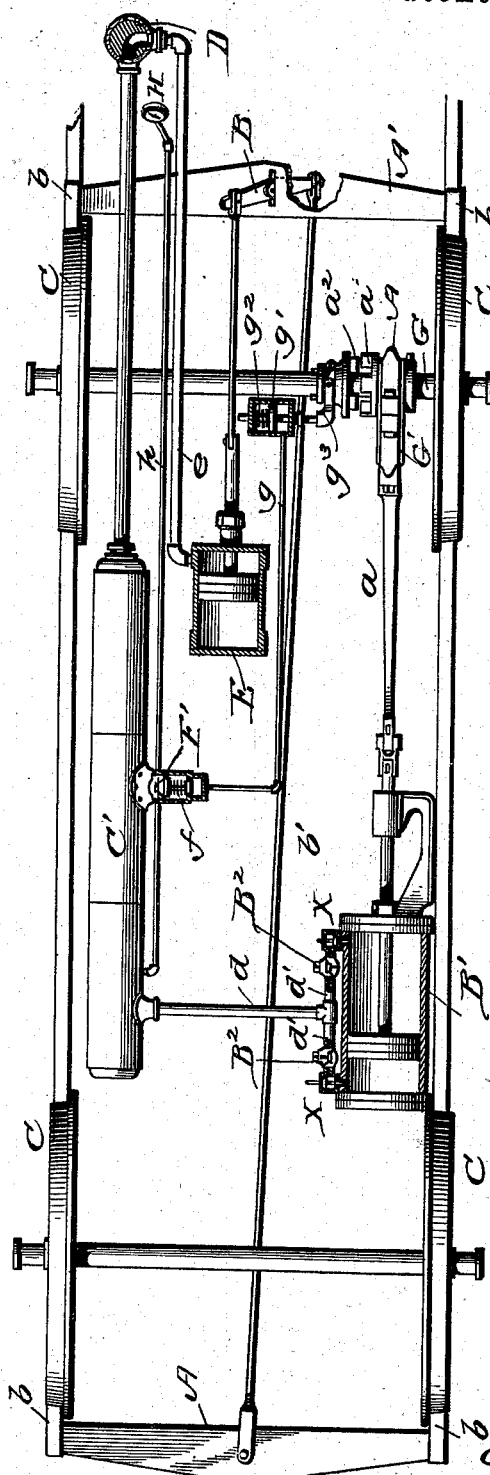
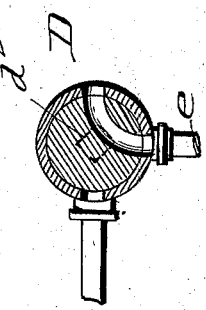
Witnesses
Inventors
Roswell S. Judson,
Gilman D. Holmes.
By Attorneys

UNITED STATES PATENT OFFICE.

ROSWELL S. JUDSON AND GILMAN D. HOLMES, OF MATTEAWAN, NEW YORK.

AIR-BRAKE FOR STREET-RAILWAY CARS.

SPECIFICATION forming part of Letters Patent No. 530,422, dated December 4, 1894.

Application filed December 20, 1893. Serial No. 494,147. (No model.)

*To all whom it may concern:*

Be it known that we, ROSWELL S. JUDSON and GILMAN D. HOLMES, citizens of the United States, residing at Matteawan, in the county of Dutchess and State of New York, have invented certain new and useful Improvements in Air-Brakes for Street-Railway Cars; and we do hereby declare the following to be a full, clear, and exact description of the invention, such as will enable others skilled in the art to which it appertains to make and use the same.

This invention relates to air brakes for street railway cars.

The object of the invention is to automatically charge the storage cylinder with air under compression and gear and ungear the air pump from the car axle at the proper moment by mechanical appliances automatic in their action.

The improvement consists of the novel features and the peculiar construction and combination of the parts which will be hereinafter more fully described and claimed and which are shown in the annexed drawings, in which—

Figure 1 is a top plan view of a car truck showing the application of the invention. Fig. 2, is a detailed view showing the valve arranged to establish connection between the brake cylinder and atmosphere.

A and A' are the brake beams at the opposite end of the truck provided with the usual brake shoes $b$ to bear against the wheels C. The equalizing lever B is carried by one of the brake beams, as A', and is connected with the other brake beam by rod $b'$. The opposite end of the equalizing lever B is connected with the piston of the brake cylinder E by means of which the brakes are set.

The storage cylinder C' for receiving the air under compression for actuating the brakes, is conveniently disposed, preferably to one side of the truck. The pump B' is connected with the storage cylinder by a pipe $d$ and branch pipes $d'$ the latter opening into the opposite ends of the pump cylinder and provided with check valves $B^2$ and X X.

The cylinder E for setting the brakes is connected by pipe $e$ with the storage cylinder C'. This pipe $e$ extends forward and is provided with a three way cock by means of which communication is effected between the said brake cylinder and the storage cylinder when it is required to set the brakes. The three way cock is operated by means of a rod $d^2$ which extends within convenient reach of the operator so as to be at all times under immediate control. An eccentric G' is loosely mounted on an axle G of the truck and serves to operate the pump through the pitman $a$ which has the usual strap connection with the said eccentric so as to be operated thereby. The eccentric G' is provided on one face with a half clutch $a'$ which is adapted to be engaged by a corresponding half clutch $a^2$ held on the axle G by a feather and spline connection. This half clutch $a^2$ is free to be moved on the axle to and from the half clutch $a'$ to cause the eccentric G' and the axle to revolve together when it is required to operate the pump for charging the cylinder C'.

To operate the clutch automatically a clutch cylinder is provided and has a connection with the storing cylinder through a pipe $g$. A spring actuated check valve F' is located at the junction of the pipe $g$ with the storing cylinder C' and is adapted to open outward when the pressure in the cylinder C' exceeds the pressure of the spring $f$ by means of which the valve F' is held on its seat. The piston $g'$ in the clutch cylinder is operated upon by a spring $g^2$ in such a manner as to bring the parts of the clutch mechanism hereinbefore set forth in gear when not compressed by the air from the storage cylinder C'. A shipper $g^3$ is connected with the piston rod of the clutch cylinder and has engagement with the half clutch $a^2$ so as to move the latter upon the axle G when the said piston of the clutch cylinder is operated. H is a pressure indicator connected by pipe $h$ to the storage cylinder to determine the pressure in the said cylinder.

The storage cylinder is charged with air under pressure by means of the pump B' operated through the eccentric and connections hereinbefore set forth. When the pressure in the storage cylinder exceeds the tension of the spring $f$ the check valve F' will be unseated and the air will enter the clutch cylinder and move the piston therein against the tension on the spring $g^2$ and move the same so as to ungear the clutch and permit the eccentric to revolve freely upon the axle.

To set the brakes, the three way cock is turned to establish communication through the pipe between the storage and brake cylinders. The piston in the latter being moved by the compressed air operates the brakes in the well known manner. The brakes are released by turning the three way cock so as to permit the air in the brake cylinder to escape. When the pressure of the air within the storage cylinder falls below the predetermined pressure of the spring $f$, the valve $F'$, will be seated and simultaneously with the seating of the valve $F'$, is the operation of the piston $g'$. This simultaneous operation takes place because the springs $f$ and $g^2$, are of the same tension, and the pressure that will overcome the spring $f$ and unseat the valve $F'$, will operate the piston $g'$ and release the clutch.

If either spring is made the stronger, it should be the spring $g^2$, so that in case the valve $F'$, should become closed first, the surplus tension of the spring $g^2$ would be sufficient to overcome the pressure of the air contained within the pipe $g$, and by this means, all possibility of the valve $F'$, being closed without the piston operating to throw the clutch in gear again, would be avoided.

Having thus described our invention, what we claim, and desire to secure by Letters Patent, is—

The herein shown and described air brake system for street railway cars, consisting of a storage cylinder, a pump for charging the storage cylinder, an eccentric for operating the pump loosely mounted on an axle and having a half clutch, a corresponding half clutch mounted on the said axle and held thereon by feather and spline connection, a clutch operating cylinder having its piston rod in connection with the movable half clutch, a spring to cause the parts of the clutch to mesh, a pipe connecting the said clutch cylinder with the storage cylinder whereby a superior air pressure in the said storage cylinder will move the clutch cylinder piston against the tension of the spring and ungear the clutch, a check valve in the said pipe, a brake cylinder for setting the brakes having communication with the said storage cylinder, and a three way cock to establish communication between the brake and storage cylinders and relieve the said brake cylinder when required, substantially as described.

In testimony whereof we affix our signatures in presence of two witnesses.

ROSWELL S. JUDSON.
GILMAN D. HOLMES.

Witnesses:
JOHN F. SCHLOSSER,
GEORGE J. SCHILLING.